(12) United States Patent
Lambert et al.

(10) Patent No.: US 11,748,246 B2
(45) Date of Patent: Sep. 5, 2023

(54) CROWD-SOURCED QA WITH TRUSTED COMPUTE MODEL

(71) Applicant: International Business Machines Corporation, Armonk, NY (US)

(72) Inventors: Shelley Lambert, Ottawa (CA); Timothy Peter Ellison, Hampshire (GB); Haechul Shin, Durham, NC (US); Gennaro A. Cuomo, Durham, NC (US); Barry Mosakowski, Raleigh, NC (US); Mark Anthony Parzygnat, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 17/242,711

(22) Filed: Apr. 28, 2021

(65) Prior Publication Data
US 2022/0353076 A1 Nov. 3, 2022

(51) Int. Cl.
*G06F 11/36* (2006.01)
*H04L 9/32* (2006.01)

(52) U.S. Cl.
CPC ...... *G06F 11/3692* (2013.01); *G06F 11/3664* (2013.01); *H04L 9/3239* (2013.01)

(58) Field of Classification Search
None
See application file for complete search history.

(56) References Cited

U.S. PATENT DOCUMENTS

| | | | |
|---|---|---|---|
| 6,862,696 B1 | 3/2005 | Voas | |
| 9,026,800 B2 | 5/2015 | Rodgers | |
| 9,262,306 B2 | 2/2016 | Balestrieri | |
| 9,760,476 B2 | 9/2017 | Ekambaram | |
| 10,009,440 B2 * | 6/2018 | Deb | G06Q 50/01 |
| 10,162,734 B1 * | 12/2018 | Podgorny | G06Q 40/123 |
| 2009/0254753 A1 * | 10/2009 | De Atley | G06F 21/51 |
| | | | 713/176 |
| 2015/0040229 A1 * | 2/2015 | Chan | G06F 21/577 |
| | | | 726/25 |
| 2015/0154405 A1 | 6/2015 | Chen | |
| 2018/0330368 A1 * | 11/2018 | Slupesky | H04L 67/02 |

(Continued)

FOREIGN PATENT DOCUMENTS

| | | |
|---|---|---|
| CN | 104579854 A | 4/2015 |
| CN | 107122300 A | 9/2017 |
| WO | 200104752 W | 1/2001 |

OTHER PUBLICATIONS

Admin, "Is It Worth Trying Crowd Testing?", 2018, https://www.crowd4test.com/blog/software-testing/ is-it-worth-trying-crowdtesting/ (Year: 2018).*

(Continued)

*Primary Examiner* — Hossain M Morshed

(74) *Attorney, Agent, or Firm* — Van Leeuwen & Van Leeuwen; Kimberly Zillig

(57) ABSTRACT

An approach is provided in which the approach collects distributed test results from multiple users, wherein at least one of the multiple users is an untrusted user. The approach aggregates the distributed test results in response to determining that each one of the distributed test results corresponds to the same system under test. The approach then presents the aggregated test results as a trusted test result.

17 Claims, 8 Drawing Sheets

(56) References Cited

U.S. PATENT DOCUMENTS

2019/0243752 A1* 8/2019 Bakshi ................ G06F 11/3688
2020/0342165 A1* 10/2020 Butkovic ................ G06F 40/30
2021/0286708 A1* 9/2021 Wang .................. G06F 11/3672
2022/0353076 A1* 11/2022 Lambert ................. G06F 21/64

OTHER PUBLICATIONS

Hobfeld, "Best Practices for QoE Crowdtesting: QoE Assessment With Crowdsourcing", 2014, IEEE (Year: 2014).*
Yan, "Emerging Privacy Issues and Solutions in Cyber-Enabled Sharing Services: From Multiple Perspectives", IEEE (Year: 2019).*
"Using Crowdsourced Quality Assurance (QA) to Deliver High Quality Software," Testing Solutions, test IO, downloaded Jan. 2021, 5 pages.
Anonymous, "Quality Improvement in the Software Development Lifecycle Based on Cryptographic Hashes and Attestation of a Prescribed Test Using Distributed Ledger Technology," ip.com, IPCOM000263821D, Oct. 7, 2020, 8 pages.

* cited by examiner

Product Code SHA
700

```
java –version

=JAVA VERSION OUTPUT BEGIN=
openjdk version "11.0.8" 2020-07-14
OpenJDK Runtime Environment AdoptOpenJDK (build 11.0.8+10-202007182339)
Eclipse OpenJ9 VM AdoptOpenJDK (build master-240c62df1, JRE 11 Linux ppc64le-64-Bit
Compressed References 20200718_652 (JIT enabled, AOT enabled)
OpenJ9 - 240c62df1
OMR - 5eb85368d                              ← 710
JCL - 790fb62403 based on jdk-11.0.8+10)
=JAVA VERSION OUTPUT END=
```

Query 750

```
IMPLEMENTOR_VERSION="AdoptOpenJDK"
JAVA_VERSION="11.0.4"
JAVA_VERSION_DATE="2019-07-16"
MODULES="java.base java.compiler java.datatransfer java.xml java.prefs java.desktop
java.instrument java.logging java.management java.security.sasl java.naming java.rmi
java.management.rmi java.net.http java.scripting java.security.jgss java.transaction.xa java.sql
java.sql.rowset java.xml.crypto java.se java.smartcardio jdk.accessibility jdk.internal.vm.ci
jdk.management jdk.unsupported jdk.internal.vm.compiler jdk.aot jdk.internal.jvmstat jdk.attach
jdk.charsets jdk.compiler jdk.crypto.ec jdk.crypto.cryptoki jdk.crypto.mscapi jdk.dynalink
jdk.internal.ed jdk.editpad jdk.hotspot.agent jdk.httpserver jdk.internal.le jdk.internal.opt
jdk.internal.vm.compiler.management jdk.jartool jdk.javadoc jdk.jcmd jdk.management.agent
jdk.jconsole jdk.jdeps jdk.jdwp.agent jdk.jdi jdk.jfr jdk.jlink jdk.jshell jdk.jsobject jdk.jstatd
jdk.localedata jdk.management.jfr jdk.naming.dns jdk.naming.rmi jdk.net jdk.pack jdk.rmic
jdk.scripting.nashorn jdk.scripting.nashorn.shell jdk.sctp jdk.security.auth jdk.security.jgss
jdk.unsupported.desktop jdk.xml.dom jdk.zipfs"
OS_ARCH="x86_64"
OS_NAME="Windows"
SOURCE=".:git:381c817fa41d"                  ← 760
```

FIG. 7

SHA Text File
800

```
===================================================
timestamp: 20200719-170253
repo dir: /home/jenkins/workspace/Test_openjdk11_hs_sanity.openjdk_x86-64_linux/openjdk-tests
git repo: Fetch URL: https://github.com/AdoptOpenJDK/openjdk-tests.git
sha: 14164e61943554307e469612f1124e4b39b5ce85                          ⸺ 810
===================================================
timestamp: 20200719-170254
repo dir: /home/jenkins/workspace/Test_openjdk11_hs_sanity.openjdk_x86-64_linux/openjdk-tests/TKG
git repo: Fetch URL: https://github.com/AdoptOpenJDK/TKG.git
sha: 0db6bba3adebcf1a9b0b2c1e17d32c880efeba1a                          ⸺ 820
===================================================
timestamp: 20200719-170305
repo dir: /home/jenkins/workspace/Test_openjdk11_hs_sanity.openjdk_x86-64_linux/openjdk-tests/openj9
git repo: Fetch URL: https://github.com/eclipse/openj9.git
sha: 240c62df1497a744fa6addc3f313d969fa1372bc                          ⸺ 830
===================================================
timestamp: 20200719-170439
repo dir: openjdk-jdk
git repo: Fetch URL: https://github.com/AdoptOpenJDK/openjdk-jdk11u.git
sha: 5af787ce84c0eecf871f78c7d1c20527b73de8c5                          ⸺ 840
```

*FIG. 8*

CROWD-SOURCED QA WITH TRUSTED COMPUTE MODEL

BACKGROUND

Software systems establish quality assurance (QA) through testing. A system under test is exposed to a number of scenarios that are typical of end user expected usage, and the system is observed to determine whether the system behaved as expected. To gain a high assurance of quality, the system under test usually runs under a wide variety of controlled in-house test scenarios before the system is released. The controlled in-house tests typically include simple functional correctness tests, performance tests, durability tests, and other tests to check that the system under test fails gracefully when operating outside the normal parameters.

The amount of testing accomplished, and therefore the quality assurance, is most often limited by the amount of available test resources. These limits may restrict the number of distinct workloads being tried, confine the amount of time spent running tests, limit the combinations or configurations under test, and/or limit the variety of hardware and operating system configurations being tested.

Crowdsourced testing is an emerging trend in software testing that exploits the benefits, effectiveness, and efficiency of crowdsourcing and the cloud platform. Crowdsourced testing differs from traditional testing methods in that crowdsourced testing is carried out by a number of different testers from different places. Crowdsourced testers may use their own devices and environments to test software, or they may access virtual machines (VMs) or device emulators via a crowdsourced testing platform. The crowdsourced testers manually execute tests of the software as requested by a customer, which can range from broad exploratory testing to highly specific functional verification testing. In turn, the crowdsourced testers provide feedback on the software, which typically includes a list of bugs and defects found while executing the tests.

BRIEF SUMMARY

According to one embodiment of the present disclosure, an approach is provided in which the approach collects distributed test results from multiple users, wherein at least one of the multiple users is an untrusted user. The approach aggregates the distributed test results in response to determining that each one of the distributed test results corresponds to the same system under test. The approach then presents the aggregated test results as a trusted test result.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 7 is an exemplary diagram depicting a product code secure hash algorithm (SHA) and a query to retrieve the secure hash algorithm; and FIG. 8 is an exemplary diagram depicting an example of a text file detailing a specific version of test material from test source repository that includes test IDs.

DETAILED DESCRIPTION

Figure 1:
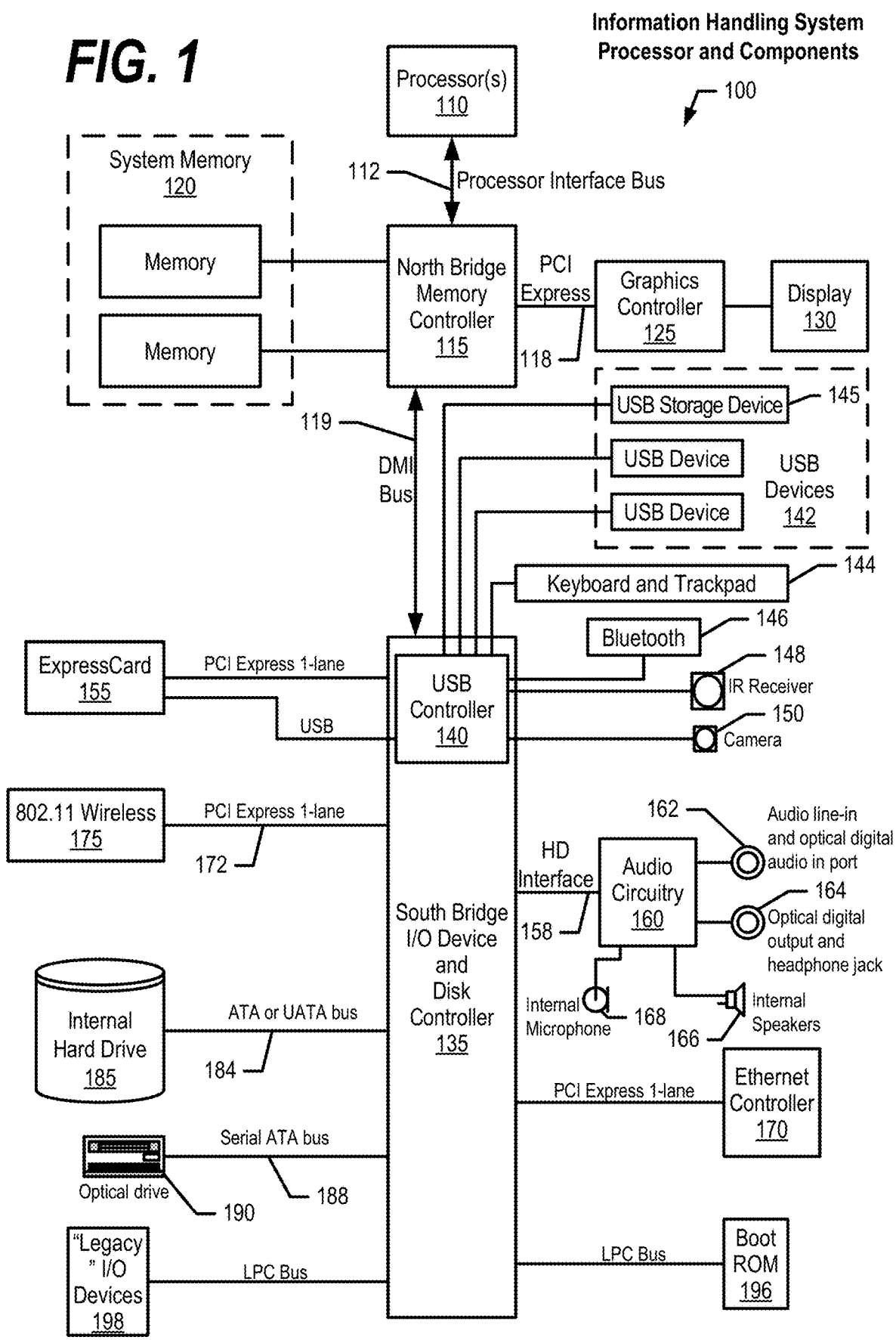
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
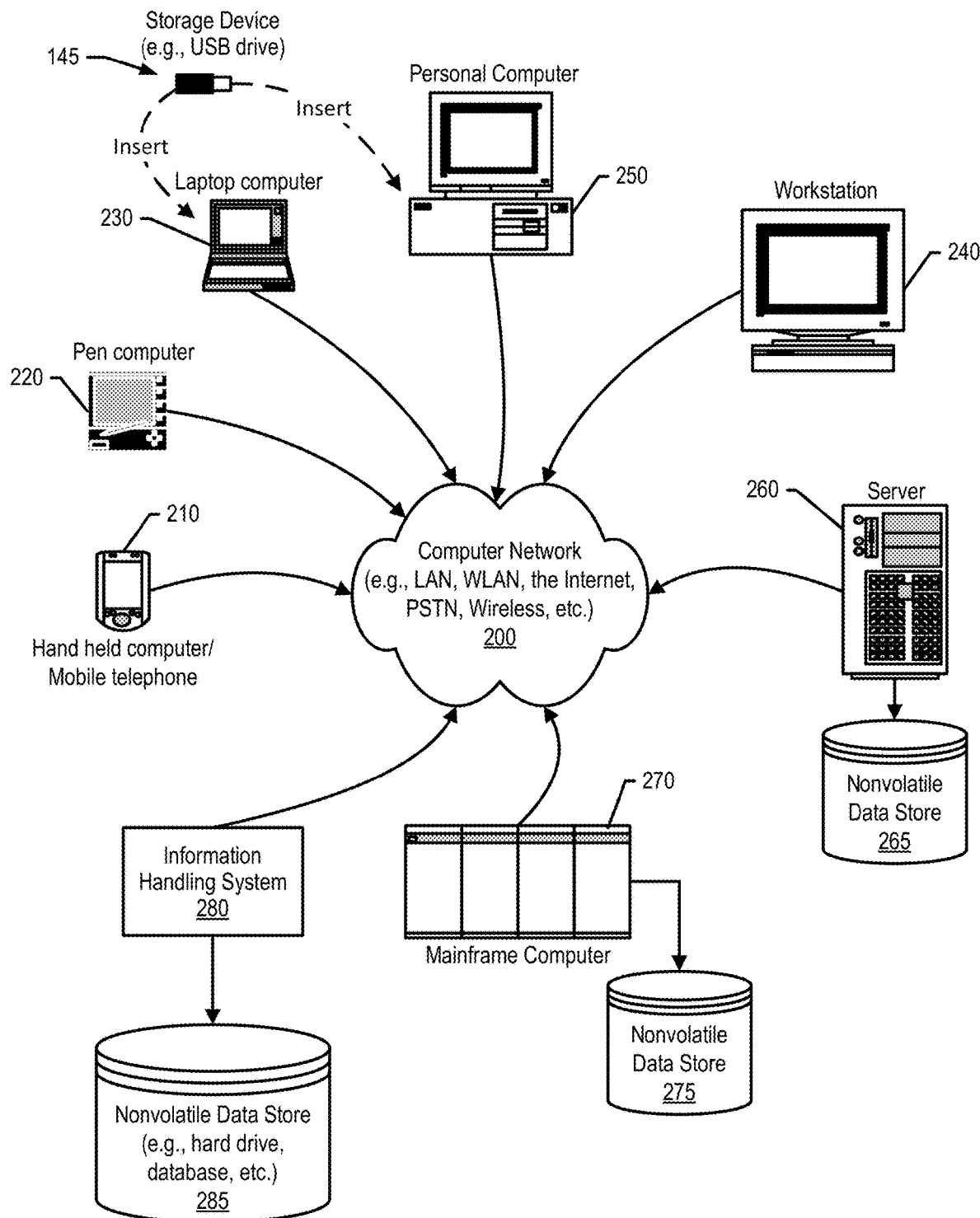
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, the quality assurance of a software system is typically based on the amount of testing performed on the software system. Today's crowd-sourced testing helps in this regard, but unfortunately focuses on manual, exploratory testing by individual skilled testers. As a result, even with today's crowdsourced testing, running all possible test scenarios on a software system is unfeasible, especially for general purpose systems corresponding to language implementation.

In addition, in a large-scale testing effort, once a system under test finishes testing and releases, end users further "test" the released system through their own use. End users typically report problems when they encounter issues or failures, but the reports are often not gathered and incorporated back into improvement of a software delivery life cycle (SDLC).

FIGS. 3 through 9 depict an approach that can be executed on an information handling system that implements a highly flexible push/pull workflow model for collecting, verifying, aggregating, and presenting distributed test results. The approach collects test results from a broad range of participants that include anonymous untrusted testers (untrusted users) in a distributed quality assurance (QA) effort. The approach further acquires a minimum number of test runs and applies a rating system to the tester (user) to determine the confidence level of the completed set of test results. As a result, the approach breaks typical dependencies in software development lifecycle (SDLC) on time and fixed pipeline tools or architectures to produce a complete picture of the quality or compliance of a system under test.

In one embodiment, the approach is particularly suitable for open source software projects where a system under test and the tests themselves are readily available for users to examine as source code. In another embodiment, the system under test is released with a unique identifier, such as a build identifier or secure hash value, which is included in runtime logs of the system. The unique identifier includes enough information to reconstruct the software system from source (e.g. using the hash value known by the source code repository). In this embodiment, the system under test is identifiable by a tag placed upon it by its version control repository.

Figure 3:
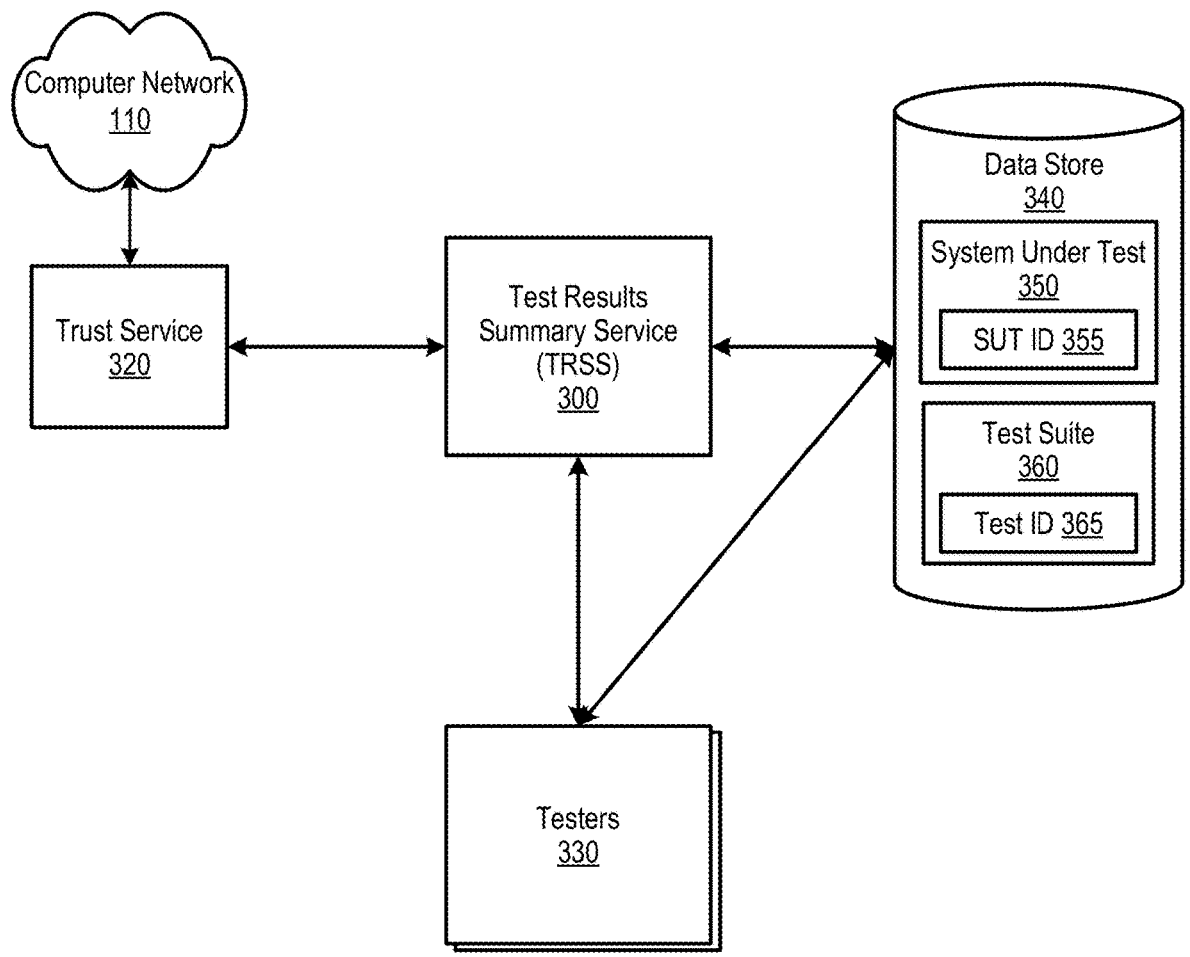
FIG. 3 is an exemplary diagram depicting a test results summary service (TRSS) outsourcing, monitoring, and receiving information regarding testing tasks.
Figure 6:
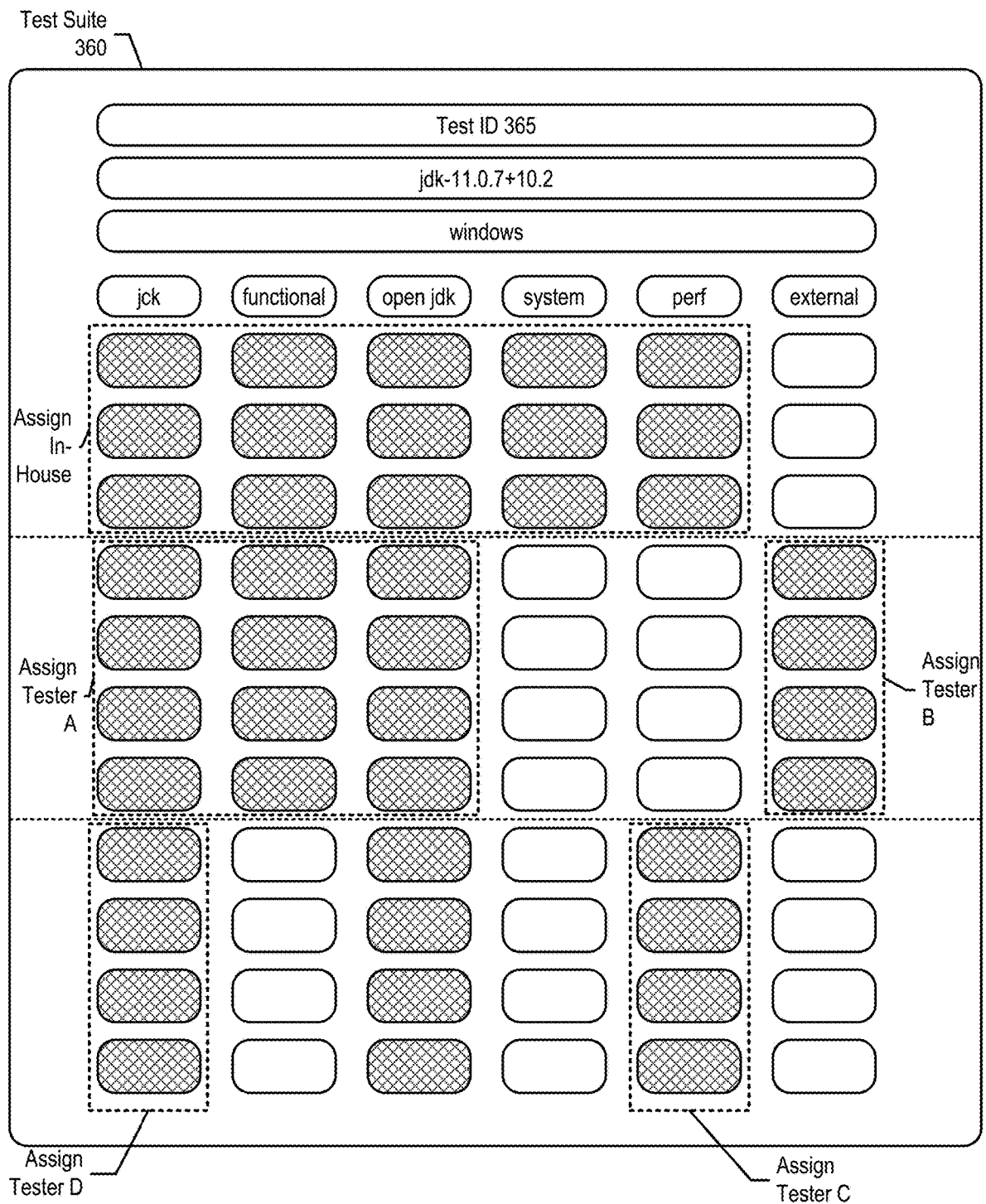
FIG. 6 is an exemplary diagram depicting how the tests are broken up into subtests (by groups and levels) and shared across a number of crowdsourced testers.

FIG. 3 is an exemplary diagram depicting a test results summary service (TRSS) 300 outsourcing, monitoring, and receiving information regarding testing tasks. As discussed herein, test results summary service 300 and trust service 320 work in conjunction to enable multiple testers 330 to concurrently test system under test 350. In one embodiment, test suite 360 (e.g., an aggregated set of distributed results, an instance of which is shown in FIG. 6), which includes a list of criteria to be satisfied for system under test 350, is decomposed into subsets to facilitate sharing its execution across multiple testers 330.

Testers 330 register with test results summary service 300, such as by using an "api/auth/register" command. Upon registration, test results summary service 300 generates a token using, for example, a JSON web token (JWT) and returns the token to testers 330. In one embodiment, trust service 320 assigns a verification level to each of testers 330 and also provides the tokens (e.g., public keys) to test results summary service 300 for disbursement.

In one embodiment, trust service 320 implements three levels of verification such as Level 0 verification (no verification), Level 1 verification (basic verification), or Level 2 verification (full verification). Level 0 is assigned to in-house testers or completely trusted sources and requires no additional process verification, such as a typical SDLC (software delivery life cycle) approach. Level 1 is a basic level verification such as a process and artifact verification that audits a software supply chain. Level 2 is assigned to unknown, untrusted sources or when full test result output requires privacy. In this embodiment, Level 2 is a full level process verification that implies the use of, for example, a distributed ledger technology that utilizes identifiers to prove that tests are executed and the results are 'true'. In this embodiment, Level 2 verification does not require that the reputation of a crowdsourced tester needs to be known in order for the results to be trusted.

Testers 330 download system under test 350, some or all of test suite 360, and identity information shown in FIGS. 7 and 8 that include system under test ID 355 and test ID 365.

In one embodiment, testers 330 download a build (system under test 350) from a public releases repository (data store 340) that also houses associated files containing query 750 and secure hash algorithm (SHA) text file 800 (see FIGS. 7, 8, and corresponding text for further details). In this embodiment, the build (system under test 350) is an executable that when executed with a "-version" option generates SHA 700. In this embodiment, when testers 330 run tests using a TKG (TestKitGen) application, which is a lightweight harness for software testing, the TKG auto-detects information about system under test 350 and exposes information such as SHA 700 as a console output. The TKG fetches the associated files containing query 750 and SHA text file 800 that match the build from the releases repository.

In one embodiment, the TKG is enabled to setup and run testing against SUT 350 given a constrained set of inputs. Using SHA text file 800 as input, the TKG downloads and sets up test material, including test material metadata, which matches the test material defined in SHA text file 800. Using inputs of location of SUT 350, the TKG queries SUT 350 to determine detailed information about SUT 350 (e.g., platform, version, implementation, built-from source repositories, etc.). With both SUT 350 and test material setup, the TKG uses the test material metadata (e.g., definitions of software test targets) to generate instructions regarding which tests are applicable to the particular SUT 350.

Figure 4:
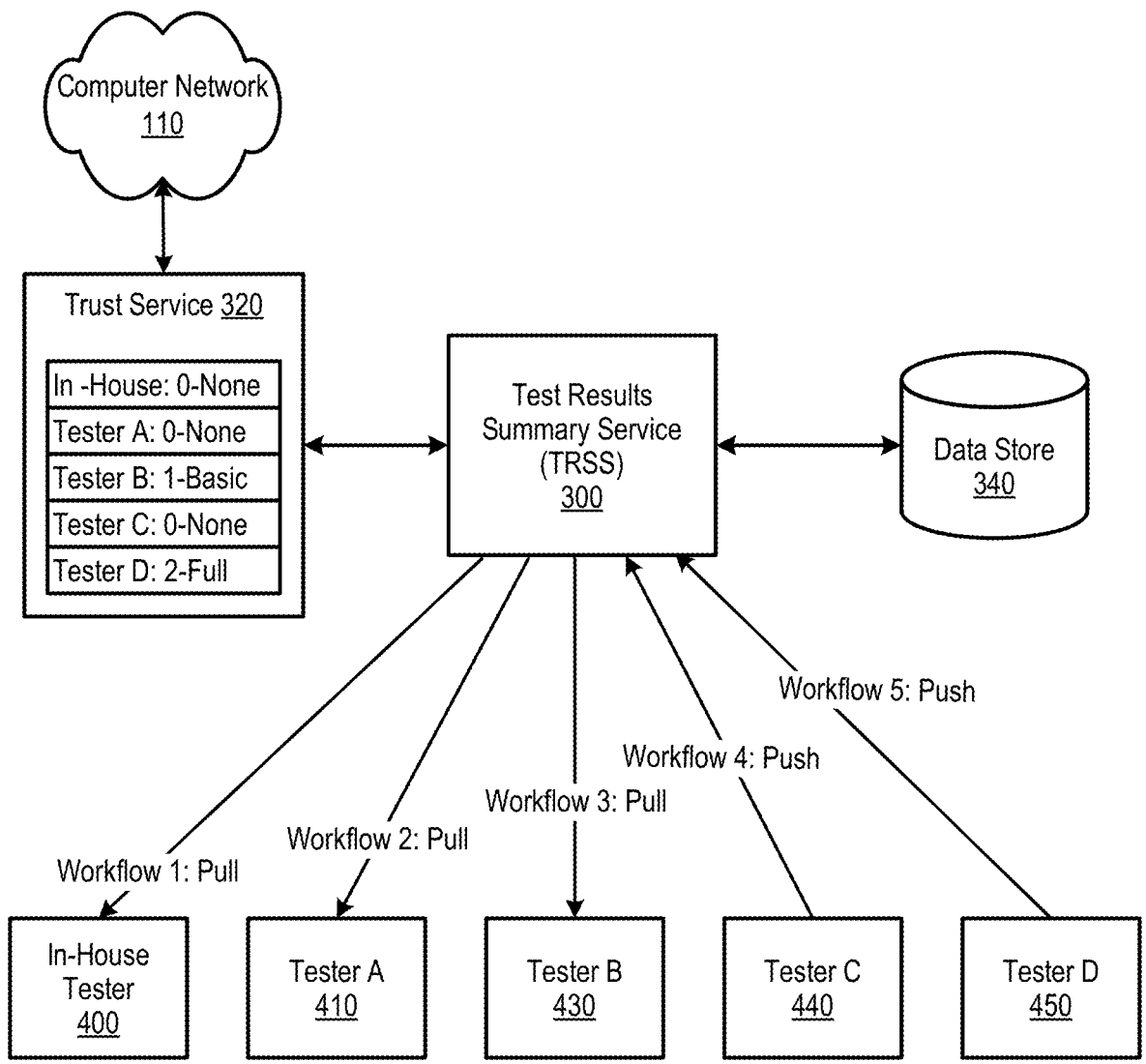
FIG. 4 is an exemplary diagram depicting the test results summary service managing five different workflows for five different testers.

In another embodiment, the TKG has ability to communicate with test results summary service 300, both to query for information (e.g., test execution times, one time test execution key, etc.) and also to push results to test results summary service 300 in the case of PUSH workflow where distributed testers register and push results to test results summary service 300 (see FIG. 4 and corresponding text for further details).

Testers 330 test portions of system under test 350 and send their test results to test results summary service 300 with their corresponding token using, for example, an "api/auth/verify" command. In one embodiment, testers 330 send the test results by running the tests via TKG and pass their token and the test instance as TKG command line options. For example, testers 330 may use a TKG command: 'make _test1-trss=trss.adoptopenjdk.net—token=xyz' that i) connects to a test results summary service 300 instance at trss.adoptopenjdk.net; ii) receives information about _test1; iii) receives a one-time test execution key unique to the test run and tester; iv) runs _test1 at a user site; v) partially encodes/tokenizes the results with an xyz token and test execution key; and vi) pushes the tokenized results to a trss.adoptopenjdk.net instance. In this embodiment, testers 330 may run tests with TKG in their local environment, which tokenizes portions of the test results to reduce the volume of results and therefore making it smaller to push/store; and uniquely associate the tokenized results to the registered tester 330.

In one embodiment, the test results include information that test results summary service 300 uses as keys to insert the result data into data store 340. In this embodiment, some of the information may be version information that is unique to a particular build of system under test 350 and includes information to uniquely identify system under test 350 (SUT ID 355). For example, the information may include commit secure hash algorithms (SHAs) of the source code repository used to build system under test 350 and the commit SHAs of the test material repositories used. Additional information pulled from the test results include vendor, OS, version, implementation, test ID 365 being reported, etc. (see FIGS. 8, 9, and corresponding text for further details).

When test results summary service 300 receives the test results with testers 330 corresponding token, test results summary service 300 sends to trust service 320 the set of tokenized results along with the public key of a particular tester 330 based on the verification level of testers 330. Depending on the verification level setting, trust service 320 may a) perform no verification; b) perform basic token verification of the results; or c) perform a deeper level of verification (e.g., based on blockchain) before test results summary service 300 inserts the test results into its database (see FIG. 5 and corresponding text for further details).

Test results summary service 300 supports several addition features because the test executions and results are distributed across multiple parties and/or organizations. Test results summary service 300 aggregates the results and stores the results in such a way that they are indexed by both an identifier of system under test 350 (SUT ID 355) and an identifier of the test material (test ID 365) to determine whether the entire test suite 360 has been completed against system under test 350.

In addition, test results summary service 300 gains a greater confidence in the test results when multiple parties run the same set of tests and report the same result. In one embodiment, test results summary service 300 enforces a particular minimum number of testers 330 that are required to execute particular subsets of tests. Some types of tests benefit from defining a certain sample size of results, such as performance tests or tests that do not result in direct pass or fail results, but are run multiple times to gain a statistically significant result that is expressed as a value within a confidence interval.

Figure 5:
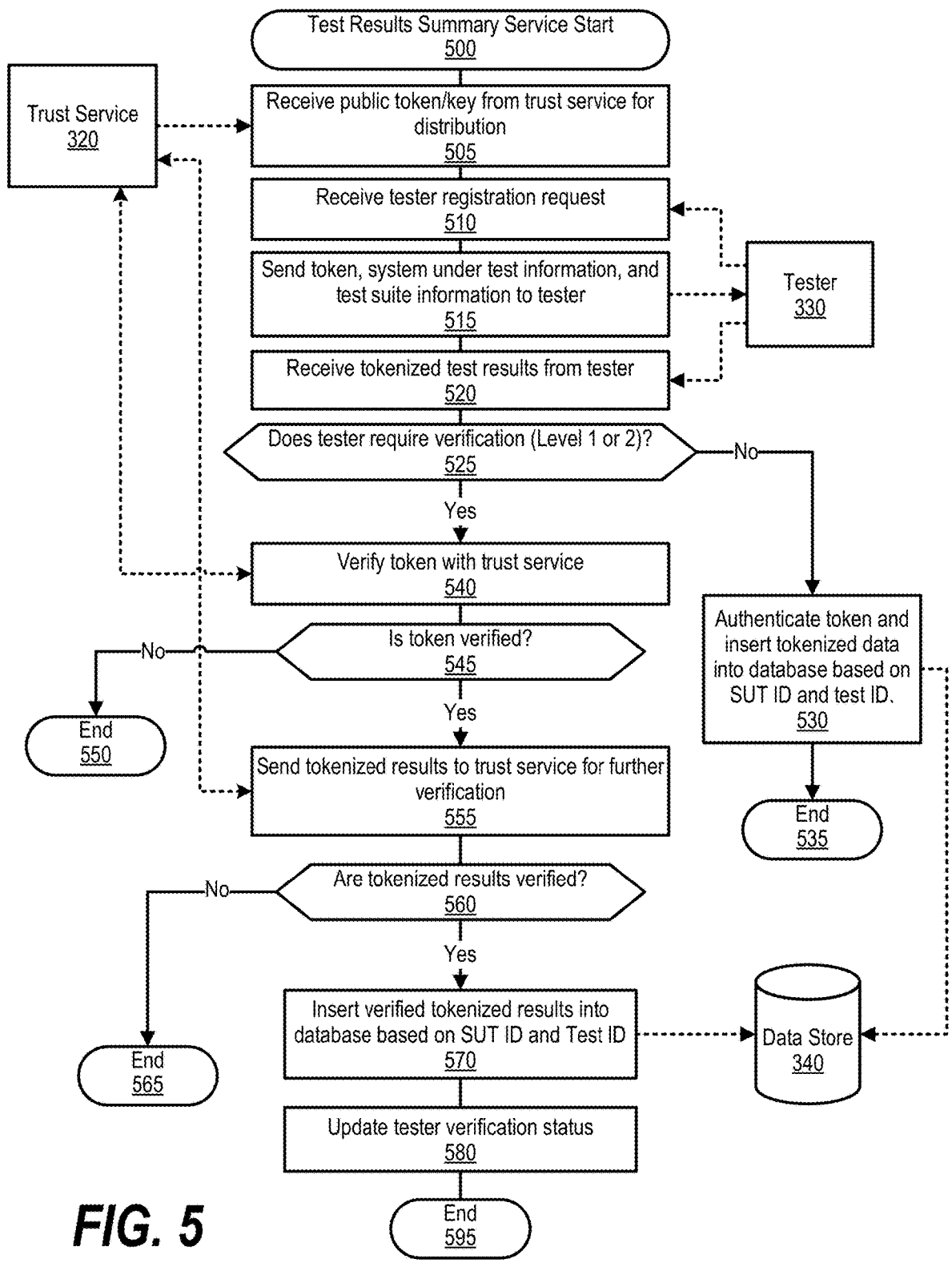
FIG. 5 is an exemplary flowchart depicting steps taken by the test results summary service to support the various workflows as discussed herein.

In one embodiment, testers 330 that report results are subject to a rating system such that over time, as they execute and report more test results, their ratings may fluctuate based on the value and accuracy of their reports and/or process (see FIG. 5 and corresponding text for further details). Optionally, when results are shared publicly, the identity and rating of the tester is sharable. In another embodiment, if testers 330 encounter issues or failures, testers 330 may also use the mechanisms described herein to share their new tests and results. The new test material is then incorporated into the test suite if the test material is deemed valuable by the community of testers responsible for the test material.

As discussed in further detail below, test results summary service 300 gathers and stores test results based on both SUT ID 355 and test ID 365. This unique way of indexing the results, along with the identity and rating of testers 330 enables test results summary service 300 to provide a very complete view of system under test 350. This cumulative perspective on test results span collections over any number of distributed servers and testers and additionally span over any amount of time. While this is not common practice today from crowdsource perspective, cumulative history and results provide the ability to perform a deep inspection on any successes or improvement of a SDLC. As new test results are gathered and added by test results summary service 300, a more complete and detailed aggregate view AI (artificial intelligence) of the quality of a software system is available and searchable.

FIG. 4 is an exemplary diagram depicting test results summary service 300 managing five different workflows for five different testers. FIG. 4 shows that test results summary service 300 uses several direct and indirect workflows to collect test results from testers 400, 410, 420, 430, 440, and 450 (collectively testers 330 in FIG. 3). In one embodiment, end users of testers 330 may register their continuous integration server locations (e.g., Jenkins, Azure Devops, etc.) for direct, anonymous registered monitoring.

In another embodiment, the end users may store their log output from their testing runs in an accessible location and let software system testers know where to obtain access to the logs. This may be as simple as sending a URL to a third-party website containing the results, (e.g., Github), or it may be a shared upload location of the software project itself if applicable. In addition, to explicit locations being submitted to the software project, a web search engine may be utilized to find examples of the test results without the test results being submitted by finding the build and test suite identifiers during a web crawl.

In another embodiment, testers 330 may push a summary of test results to test results summary service 300 which has an API to accept a particular agreed upon format of test results. As shown in FIG. 4, these different approaches can be categorized in either a push model or a pull model where the results are pulled into data store and aggregated, combined, and summarized to form a complete picture of the full effort to verify the quality of the system under test.

Trust service 320 assigns various levels of automated 'trust' to various testers. As discussed above, Level 0 indicates no extra verification of the process is applied; Level 1 requires some basic verification of the process is included in the automation; and Level 2 requires enterprise level verification of the process is included in the automation. In one embodiment, Level 2 is a placeholder for a more stringent verification, such as applying distributed ledger technology.

Workflows may be categorized in either a "push" model where testers push their results, or a "pull" model where the results are pulled into data store 340 where the results are aggregated, combined, and summarized to form a complete picture of the full effort to verify the quality of the product under test. FIG. 4 shows that in-house tester 400, tester A 410, and tester B 430 have pull model workflows, while tester C 440, and tester D 450 have push model workflows.

In-house tester 400 invokes workflow 1, which is a present state of automation where tests are run in-house using a preferred test framework that ensures the necessary identifiers are included in the test output and test results are pulled from the continuous integration system into test results summary service 300. For example, a preferred test framework, "testkitgen" (TKG), ensures both that the identifiers are included in the test output and that the test results transmitted from in-house tester 400 to test results summary service 300 are reduced to their most compact form while still including all necessary and relevant information.

Tester A 410 invokes workflow 2 and corresponds to a Level 0 status, which indicates that no interaction is needed between test results summary service 300 and trust service 320. Workflow 2 exemplifies scenarios where a tester does not use TKG, but runs tests whose output includes the identifiers required for uniquely identifying objects under test and test material. For example, the test output contains log output with product source and test source SHAs depicted. In one embodiment, workflow 2 includes a web crawler that finds test output containing identifiers that match those already being aggregated in test results summary service 300 to actively seek out those who are testing the object. In this embodiment, workflow 2 may also use a tester or end user that explicitly shares test results and output from known or new test cases, which the required identifiers are shared and pulled into test results summary service 300 from Tester A 410.

Tester B 430 invokes workflow 3 running tests via TKG and monitored via test results summary service 300 because tester B 420 is assigned a Level 1 basic trust verification per trust service 320. In this embodiment, test results summary service 300 interacts with trust service 320 to apply basic verification of the process which includes checking signatures of product binary and that all metadata link files correspond with product and test material in use (see FIG. 5 and corresponding text for further details).

Tester C 430 invokes workflow 4 that, for example, has a continuous integration (CI) system that is not publicly accessible. Tester C 430 wishes to participate in testing a release, but test results summary service 300 cannot pull the test results because of its inaccessibility. Therefore, tester C 430 registers with test results summary service 300 to push results to test results summary service 300 and, because trust service 320 assigns a Level 0 verification level to tester C, the workflow remains simple such that no additional level of verification of the results are required.

Tester D 450 invokes workflow 5, which is running test material that has a restrictive license because trust service 320 assigned a Level 2 full verification level to tester D 450. In one embodiment, of the many restrictions, this test material must be run in an environment fully controlled by the licensee and details, data/output from this test material are not allowed to be shared. A licensee is only allowed to report whether they passed or failed the set of tests. In this workflow, tester D 450 runs these tests in a trusted execution environment where the pass/fail results are pushed to test results summary service 300 and the verification of the process is confirmed by trust service 320. This workflow may be used where the test material remains proprietary to a user who does not wish to disclose it to the project. In one embodiment, if results are pushed to test results summary service 300 from an unknown and therefore untrusted source, test results summary service 300 defaults to Level 2 verification.

FIG. 5 is an exemplary flowchart depicting steps taken by test results summary service 300 to support various workflows as discussed herein. FIG. 5 processing commences at 500 whereupon, at step 505, the process receives public tokens/keys from trust service 320 for distribution. At step 510, the process receives a tester registration request from one of testers 330.

At step 515, the process sends a token, system under test information, and test suite information to tester 330 to test system under test 350 using test suite 360. In one embodiment, the process checks whether tester 330 is in a list of known members and, if so, assigns a trust verification level for results received. In this embodiment, if tester 330 is not on the known list, the process assumes that tester 330 is unknown and assigns a trust verification Level 2. In one embodiment, an option exists to apply trust verification Level 2 to all testers 330, even if a tester is in-house, known and trusted.

At step 520, the process receives tokenized test results from tester 330. The process determines as to whether tester 330 requires verification (Level 1 or Level 2) (decision 525). In one embodiment, test results summary service 300 maintains a list of known entities and their corresponding verification level. In this embodiment, if test results summary service 300 does not locate tester 330 on the list, then test results summary service 300 assumes a default Level 2. In this embodiment, an unknown tester could potentially become known over time, as they continue to unerringly run and report valid test results and move to Level 1 (see step 580 and corresponding text for further details).

If tester 330 does not require verification (Level 0), then decision 525 branches to the 'no' branch whereupon, at step 530, the process authenticates the token and inserts the tokenized data into data store 340 based on the test results' corresponding SUT ID 355 and test ID 365. FIG. 5 processing thereafter ends at 535.

On the other hand, if tester 330 requires verification, then decision 525 branches to the 'yes' branch whereupon, at step 540, the process verifies the token with trust service 320. In one embodiment, when tester 330 is an in-house tester with Level 0 verification, tester 330 is fully trusted because the testing is done in-house and production of test results are fully visible, so no further verification is required. If tester 330 is a known and trusted member of a project running tests off-site with Level 1 verification, test results summary service 300 verifies that the artifact being pushed is actually coming from the known member and not someone pretending to be the known member.

In one embodiment, when a known and trusted member running tests with a restrictive license requiring that test materials and output remain closed (Level 2 verification), test results summary service 300 verifies both the artifact is from the known tester, verifies the tests were run, and the binary result, pass or fail, is accurate to the closed/opaque test material used. When tester 330 is an unknown, untrusted tester running tests off-site (Level 2 verification), test results summary service 300 verifies both that artifact being pushed matches the tester that registered and verifies that the contents of the test results have not been altered.

The process determines as to whether trust service 320 verifies the token (decision 545). If the token is not verified, then decision 545 branches to the 'no' branch whereupon FIG. 5 processing thereafter ends at 550. On the other hand, if trust service 320 verifies the token, then decision 545 branches to the 'yes' branch whereupon, at step 555, the process sends the tokenized results to trust service 320 for further verification. In one embodiment, trust service 320 verifies the tokenized results using distributed ledger technology (e.g., blockchain) for a tester with Level 2 verification (untrusted tester or unshareable/opaque results).

In one embodiment, trust service 320 has the capability to plug-in different algorithms/methods of verification at different verification levels and dynamically insert new levels of verification. In the case of untrusted testers, test results summary service 300 may accept many hundreds of results for the same unique unit of test results and, based on consensus of the distributed results, determine to trust individual results and not trust other individual results.

In one embodiment, testers 330 use a TKG framework that has access to unique identifiers for the tester (key), the system under test (source repositories in combination with SHA-1 hashes of those repos) and the test material in use (test source repositories in combination with SHA-1 hashes of those repositories), and queries an API of test results summary service 300 for metadata (e.g., average test execution time) about previous test runs. In this embodiment, the TKG framework connects to test results summary service 300 at the start of a test run, at which point the TKG framework is assigned a one-time test execution key associated to that particular test execution instance from that particular tester. The TKG framework generates a short-form of the test results, and encodes, tokenizes and/or uniquely modifies the output of test results in a manner unique to the tester, system under test, and test material and the instance of test execution. This encoding or tokenization is not easily discoverable and reproducible by tester 330, therefore making it very difficult for tester 330 to covertly tamper with test results before sharing them with test results summary service 300.

The process determines as to whether trust service 320 verifies the tokenized results (decision 560). If the tokenized results are not verified, then decision 560 branches to the 'no' branch whereupon FIG. 5 processing thereafter ends at 565.

On the other hand, if the tokenized results are verified, then decision 560 branches to the 'yes' branch whereupon, at step 570, the process inserts verified tokenized results into data store 340 based on its SUT ID 355 and test ID 365. At step 580, in one embodiment, the process updates tester 330's verification status, such as incrementing a counter on the number of times that tester 330 provides truthful test results and relaxing tester 330's verification level (e.g., Level 2→Level 1) once the counter reaches a threshold. FIG. 5 processing thereafter ends at 595.

FIG. 6 is an exemplary diagram depicting how the tests can be broken up into software test targets (by groups and levels) and shared across a number of crowdsourced testers. Test suite 360 includes test ID 365 and a number of test units that are assigned to various testers. In one embodiment, test ID 365 is constructed from hash values or tags of source code repositories where test suite 360 resides (see FIG. 8 and corresponding text for further details).

Test results summary service 300, in one embodiment, provides a graphical user interface (GUI) similar to the target diagram shown in FIG. 6 that testers 330 can review, which includes software test target indicators (rectangles) corresponding to software test targets. Testers 330 can then choose to help fill in uncompleted software test targets or testers 330 can run other tests. When testers 330 sends test results to test results summary service 300 that were not yet completed, the uncompleted sections in the GUI show as completed targets upon insertion of results into the database. If testers 330 send test results to test results summary service 300 that were already completed, then test results summary service 300 has more than one set of results for some targets in the diagram that are useful in a consensus model for verifying the results to use.

In one embodiment, test results summary service 300 provides a setting to require "X" number of results to be registered for each software test target before the verification of SUT 350 is deemed as completed. If test results summary service 300 detects discrepancies between results in the set reported, in-house testers could audit the results, rerun the software test targets, or the results with most consensus are accepted as the trusted results.

FIG. 7 is an exemplary diagram depicting a product code secure hash algorithm (SHA) and a query to retrieve the secure hash algorithm. Product code SHA 700 includes lines 710, which are three short SHA-1 hashes of product code from a version output and make up SUT ID 355. Lines 710 show that the system under test is built from combination of source code from three repositories, which are OpenJ9 (code 240c62df1), OMR (code 5eb85368d), and JCL (code 790fb62403). Product code SHA 700 is example of an SHA that is retrieved from running a system under test and observing its output.

Test results summary service 300 constructs an identifier for the system under test (SUT ID 355) using the secure hashes (SHA-1s) or keys of the source code repositories in which the software code is found. Depending on the software under test, testers 330 may use a few ways to access the SHA from the product code. In one embodiment, before running any tests, the TKG framework runs "java—version" that then outputs the information for a certain type of system under test (SHA 700). Testers 330 then include the information in the test results that are supplied (by push or pull) to test results summary service 300.

Query 750 is an example of a query related to the system under test to retrieve an SHA-1 hash. Line 760 includes SOURCE=".:git:381c817fa41d," which refers to a short SHA-1 form of a particular commit SHA. For a certain type of system under test, this file is part of the system under test. The TKG framework logs the contents of this file that is then included in the test results that are supplied (by push or pull) to test results summary service 300.

FIG. 8 is an exemplary diagram depicting an example of a text file detailing a specific version of test material from test source repository that includes test IDs. As discussed below, four test code repositories are used in a particular run that produced SHA text file 800, which includes unique SHA-1 hashes to identify the test material itself for each of the four repositories.

Lines 810 include SHA: 14164e61943554307e469612f 1124e4b39b5ce85, which is a full 40-character SHA-1 for the test material cloned from a "AdoptOpenJDK/openjdk-tests.git" repository. Lines 820 include SHA: 0db6bba3ad ebcf1 a9b0b2c1e17d32c880efeba1a, which is a full 40-character SHA-1 for the test material cloned from an "AdoptOpenJDK/TKG.git" repository.

Lines 830 include SHA: 240c62df1497a744fa6 addc3f313d969fa1372bc, which is a full 40-character SHA-1 for the test material cloned from an "eclipse/openj9.git" repository. Lines 840 include SHA: 5af787ce 84c0eecf871f78c7d1c20527b73de8c5, which is a full 40-character SHA-1 for the test material cloned from an "AdoptOpenJDK/openjdk-jdk11u.git" repository.

The repositories correlate to shaded segments of test suite 360 shown in FIG. 6 and are used by test results summary service 300 as keys to insert into the database and a way to determine whether testers 330 are contributing to the same overall set of aggregated test results. For example, if in-house tester 400 runs test material uniquely identified by the SHA-1 hashes, and Tester A 410 runs test material with matching hashes, both of their results are aggregated to help fill in the shaded segments of test suite 360 shown in FIG. 6. If Tester A 410 runs test material with a different set of hashes, indicating that the test material is different, their results are used to form a different aggregate set of results (a different instance of test suite 360).

In one embodiment, as part of running the test, testers 330 download test suite 360 and, if testers 330 run with a TKG framework, the TKG framework automatically looks for SHA text file 800 that is used by in-house testing. With SHA text file 800, the TKG framework clones each test source code repository, and may use a "git" repository URL and SHA retrieve and access the same test material as used by in-house testing. Without SHA text file 800, the TKG framework uses the git repository URL and clones the current contents of a master branch and checkout based on a latest commit SHA, which may or may not match the SHA captured at the time of in-house testing. In a case where the test material does not match, test results summary service 300 gathers and stores the results towards a separate set of accumulated results (a separate instance of FIG. 6 keyed with a different test code identifier).

In another embodiment, if the tests are not programmatic, such as non-programmatic rules, conventions, or guidelines, the tests still have an expectation that they are version controlled and tagged, where the tag provides a unique identifier. For example, a set of compliance rules may be non-programmatic and must be followed, and while these rules may not live in a source code repository, they are still versioned controlled by having specific, unique book editions or codes. As the tests execute, the TKG framework identifies both the system under test and the tests being executed by the information contained in the log output.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
collecting a plurality of distributed test results from a plurality of users, wherein at least one of the plurality of users is an untrusted user;
selecting one of the plurality of distributed test results corresponding to a selected one of the plurality of users;
determining a verification level of the selected user;
in response to determining that the selected user requires verification, verifying the selected user by verifying a token sent with the selected distributed test results;
in response to verifying the selected user, verifying the selected distributed test results;
in response to verifying the selected distributed test results, aggregating the selected distributed tests results based on both a system under test ID and a test ID;
aggregating the plurality of distributed test results in response to determining that each one of the plurality of distributed test results corresponds to a same system under test; and
presenting the aggregated test results as a trusted test result.

2. The method of claim 1 further comprising:
utilizing a trust service to verify the selected user, wherein the trust service implements a plurality of verification levels; and
adding a new verification level to the trust service in response to verifying the selected distributed test results.

3. The method of claim 1 further comprising:
adjusting the verification level of the selected user in response to determining that an amount of times the selected user provides truthful distributed test results reaches a threshold.

4. The method of claim 1 further comprising:
determining that a first one of the plurality of distributed test results from a first one of the plurality of users corresponds to a software test target;
determining that a second one of the plurality of distributed test results from a second one of the plurality of users corresponds to the software test target; and
combining the first distributed test results with the second distributed test results in response to determining that they both correspond to the same software test target.

5. The method of claim 3 further comprising:
providing a graphical user interface to the plurality of users that comprises a plurality of software test target indicators;
identifying a selected one of the plurality of test target indicators that corresponds to the software test target; and
marking the software test target indicator as complete in response to receiving the first distributed test results.

6. The method of claim 1 further comprising:
prior to collecting the plurality of distributed test results, receiving a registration request from the untrusted user and sending a public key to the untrusted user in response to receiving the registration request; and
verifying the untrusted user based on verifying the public key included in a set of the plurality of distributed test results sent from the untrusted user.

7. An information handling system comprising:
one or more processors;
a memory coupled to at least one of the processors;
a set of computer program instructions stored in the memory and executed by at least one of the processors in order to perform actions of:
collecting a plurality of distributed test results from a plurality of users, wherein at least one of the plurality of users is an untrusted user;
selecting one of the plurality of distributed test results corresponding to a selected one of the plurality of users;
determining a verification level of the selected user;
in response to determining that the selected user requires verification, verifying the selected user by verifying a token sent with the selected distributed test results;
in response to verifying the selected user, verifying the selected distributed test results;
in response to verifying the selected distributed test results, aggregating the selected distributed tests results based on both a system under test ID and a test ID;
aggregating the plurality of distributed test results in response to determining that each one of the plurality of distributed test results corresponds to a same system under test; and
presenting the aggregated test results as a trusted test result.

8. The information handling system of claim 7 wherein the processors perform additional actions comprising:
utilizing a trust service to verify the selected user, wherein the trust service implements a plurality of verification levels; and
adding a new verification level to the trust service in response to verifying the selected distributed test results.

9. The information handling system of claim 7 wherein the processors perform additional actions comprising:

adjusting the verification level of the selected user in response to determining that an amount of times the selected user provides truthful distributed test results reaches a threshold.

10. The information handling system of claim 7 wherein the processors perform additional actions comprising:

determining that a first one of the plurality of distributed test results from a first one of the plurality of users corresponds to a software test target;

determining that a second one of the plurality of distributed test results from a second one of the plurality of users corresponds to the software test target; and combining the first distributed test results with the second distributed test results in response to determining that they both correspond to the same software test target.

11. The information handling system of claim 10 wherein the processors perform additional actions comprising:

providing a graphical user interface to the plurality of users that comprises a plurality of software test target indicators;

identifying a selected one of the plurality of test target indicators that corresponds to the software test target; and marking the software test target indicator as complete in response to receiving the first distributed test results.

12. The information handling system of claim 7 wherein the processors perform additional actions comprising:

prior to collecting the plurality of distributed test results, receiving a registration request from the untrusted user and sending a public key to the untrusted user in response to receiving the registration request; and verifying the untrusted user based on verifying the public key included in a set of the plurality of distributed test results sent from the untrusted user.

13. A computer program product stored in a computer readable storage medium, comprising computer program code that, when executed by an information handling system, causes the information handling system to perform actions comprising:

collecting a plurality of distributed test results from a plurality of users, wherein at least one of the plurality of users is an untrusted user;

selecting one of the plurality of distributed test results corresponding to a selected one of the plurality of users;

determining a verification level of the selected user;

in response to determining that the selected user requires verification, verifying the selected user by verifying a token sent with the selected distributed test results;

in response to verifying the selected user, verifying the selected distributed test results;

in response to verifying the selected distributed test results, aggregating the selected distributed tests results based on both a system under test ID and a test ID;

aggregating the plurality of distributed test results in response to determining that each one of the plurality of distributed test results corresponds to a same system under test; and presenting the aggregated test results as a trusted test result.

14. The computer program product of claim 13 wherein the information handling system performs further actions comprising:

utilizing a trust service to verify the selected user, wherein the trust service implements a plurality of verification levels; and adding a new verification level to the trust service in response to verifying the selected distributed test results.

15. The computer program product of claim 13 wherein the information handling system performs further actions comprising:

adjusting the verification level of the selected user in response to determining that an amount of times the selected user provides truthful distributed test results reaches a threshold.

16. The computer program product of claim 13 wherein the information handling system performs further actions comprising:

determining that a first one of the plurality of distributed test results from a first one of the plurality of users corresponds to a software test target;

determining that a second one of the plurality of distributed test results from a second one of the plurality of users corresponds to the software test target; and combining the first distributed test results with the second distributed test results in response to determining that they both correspond to the same software test target.

17. The computer program product of claim 16 wherein the information handling system performs further actions comprising:

providing a graphical user interface to the plurality of users that comprises a plurality of software test target indicators;

identifying a selected one of the plurality of test target indicators that corresponds to the software test target; and marking the software test target indicator as complete in response to receiving the first distributed test results.

* * * * *